US007884687B2

(12) United States Patent
Lee

(10) Patent No.: US 7,884,687 B2
(45) Date of Patent: Feb. 8, 2011

(54) MAGNETIC INTERFACE CIRCUIT

(75) Inventor: Ming-Chih Lee, Tu-Cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 850 days.

(21) Appl. No.: 11/807,517

(22) Filed: May 29, 2007

(65) Prior Publication Data

US 2007/0297201 A1 Dec. 27, 2007

(30) Foreign Application Priority Data

May 29, 2006 (TW) .............................. 95209267 U

(51) Int. Cl.
*H03H 7/18* (2006.01)
*H03H 7/21* (2006.01)
(52) U.S. Cl. .................... 333/177; 333/12; 333/185; 333/181
(58) Field of Classification Search ............. 333/119, 333/12, 177, 185, 181; 336/232, 223, 200, 336/116
See application file for complete search history.

(56) References Cited

U.S. PATENT DOCUMENTS 6,295,356 B1 * 9/2001 De Nicolo ............ 379/413
6,492,880 B1 * 12/2002 Chiappe et al. ........... 333/22 R
2004/0160312 A1 * 8/2004 Fisher et al. ........... 340/310.01
2004/0239465 A1 12/2004 Chen et al.
2007/0015416 A1 * 1/2007 Gutierrez et al. ............ 439/676
2007/0074052 A1 * 3/2007 Hemmah et al. ............ 713/300
2008/0074906 A1 * 3/2008 Tsai et al. ................ 363/21.01

* cited by examiner

*Primary Examiner*—Gary L Laxton
*Assistant Examiner*—Nusrat J Quddus
(74) *Attorney, Agent, or Firm*—Ming Chieh Chang; Wei Te Chung; Andrew C. Cheng

(57) ABSTRACT

A magnetic interface circuit (100) includes a pair of channels (101, 102) and an absorb network (3). Each channel includes a 3-wire common mode choke (2) having a middle tap (21), and an isolation transformer (1) connected with the 3-wire common mode choke. The isolation transformer has a primary winding (11) and a secondary winding (12) each having a pair of first output taps (111, 121) and a first center tap (13, 14). The absorb network includes a bridge rectifying circuit (4) adapted for converting an electrical current. Each bridge rectifying circuit has a pair of input taps (45, 46) each connected with corresponding center taps of the isolation transformers, and a pair of output taps (47, 48).

10 Claims, 3 Drawing Sheets

MAGNETIC INTERFACE CIRCUIT

BACKGROUND OF THE INVENTION

1. Field of the Invention

The present invention relates to a magnetic interface circuit, and particularly to a PoE (Power over Ethernet) magnetic interface circuit adapted for providing power supply and signals to an inner network.

2. Description of Related Art

A magnetic interface circuit is described in U.S. Pat. No. 7,123,117, which was issued on Oct. 17, 2006. The magnetic interface circuit comprises a transformer having a first winding connected to a line side of a LAN (Local Area Network) and a second winding connected to a circuit side of the LAN. The first and the second windings respectively have a pair of output ports. The first winding has a center tap port. A 3-wire CMC (Common Mode Choke) having a center winding and two outer windings. The center winding of the 3-wire CMC is connected to the center tap of the first winding. The outer windings of the 3-wire CMC are respectively connected to the output ports of the first winding. The magnetic interface circuit has a pair of DC (Direct Current) busses provided for a PoE port. When the magnetic interface circuit is supplied in a PoE system, the center taps of the 3-wire CMC are connected to a direct current power supply of a PSE (Powered Sourcing Equipment), via the DC busses. An inner network is connected to the direct current power supply of the PSE via the magnetic interface circuit to thereby form the PoE system. The magnetic interface circuit provides power supply from the direct current power supply to the inner network.

Polarity of the power supply provided by the magnetic interface circuit conforms with polarity of the direct power supply. When polarity of the direct power supply does not match with polarity of the inner network, the inner network could not get an available power supply from the magnetic interface circuit.

Hence, an improved magnetic interface circuit is required to overcome the above-mentioned disadvantages of the related art.

SUMMARY OF THE INVENTION

A primary object of the present invention is to provide a magnetic interface circuit adapted for causing an electrical current to flow in a prescribed direction.

To achieve the aforementioned object, a magnetic interface circuit is connected between a direct current power supply and an inner network and comprises a transmit channel, a receive channel and a network. Each channel comprises a 3-wire common mode choke having a pair of outer taps and a middle tap, and an isolation transformer connected with the 3-wire common mode choke. The isolation transformer has a primary winding and a secondary winding. The primary winding has a pair of first output taps connected with the outer taps and a first center tap connected with said middle tap. The secondary winding has a pair of second input taps and a second center tap. The absorb network comprises a bridge rectifying circuit adapted for converting an electrical current. The bridge rectifying circuit is formed with a pair of input taps each connected with corresponding second center tap of the isolation transformers, and a pair of output taps.

The bridge rectifying circuit is adapted for causing the electrical current to flow in a prescribed direction, and blocking the electrical current from flowing in opposite direction. Even if cathode and anode of the direct current power supply is exchanged, polarity of the power supply provided by the magnetic interface circuit would not be changed. Therefore, the inner network could always get an available power supply.

Other objects, advantages and novel features of the invention will become more apparent from the following detailed description of a preferred embodiment when taken in conjunction with the accompanying drawings.

DETAILED DESCRIPTION OF THE INVENTION

Figure 1:
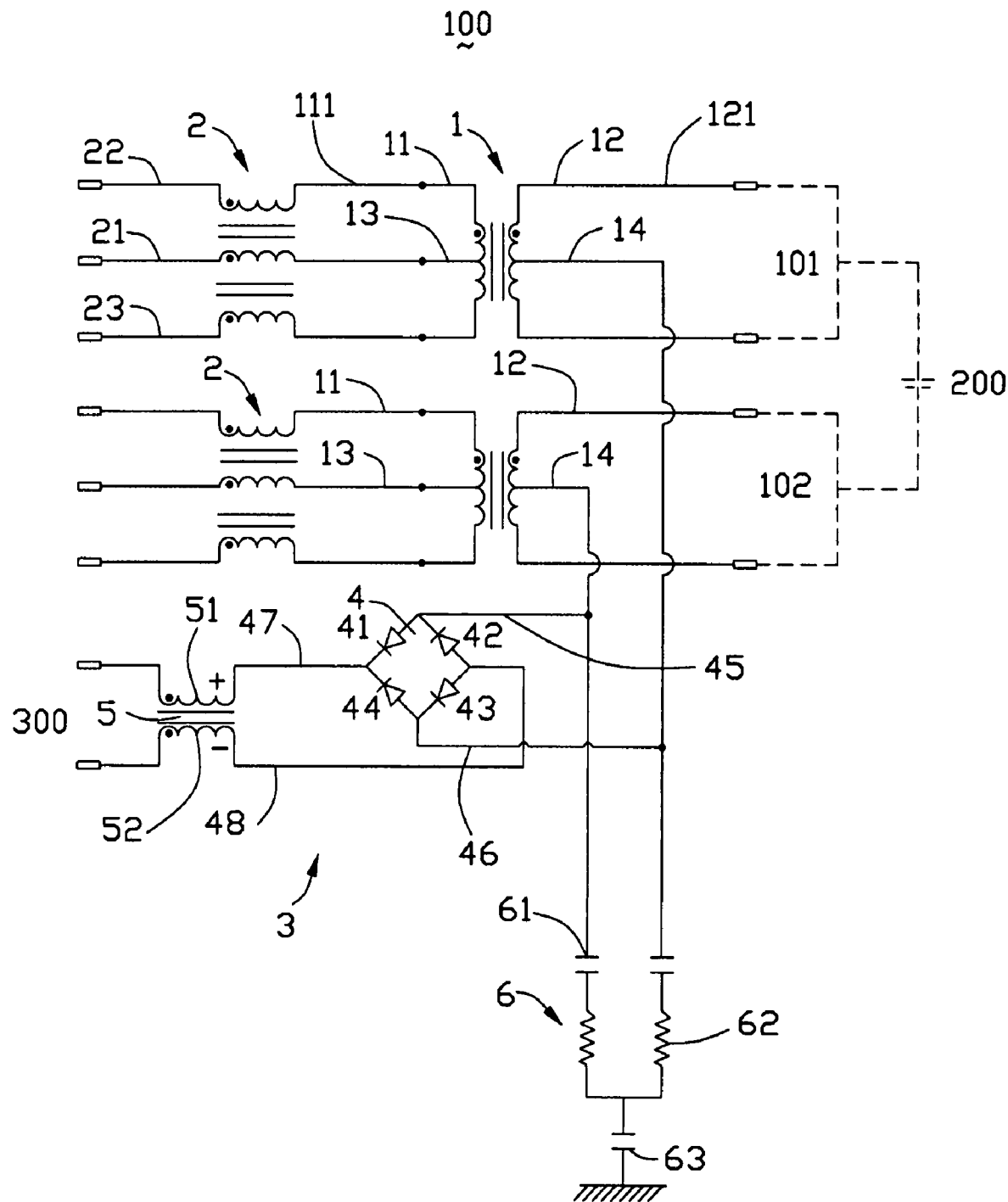
FIG. 1 is a schematic view of a magnetic interface circuit in accordance with the present invention.
Figure 2:
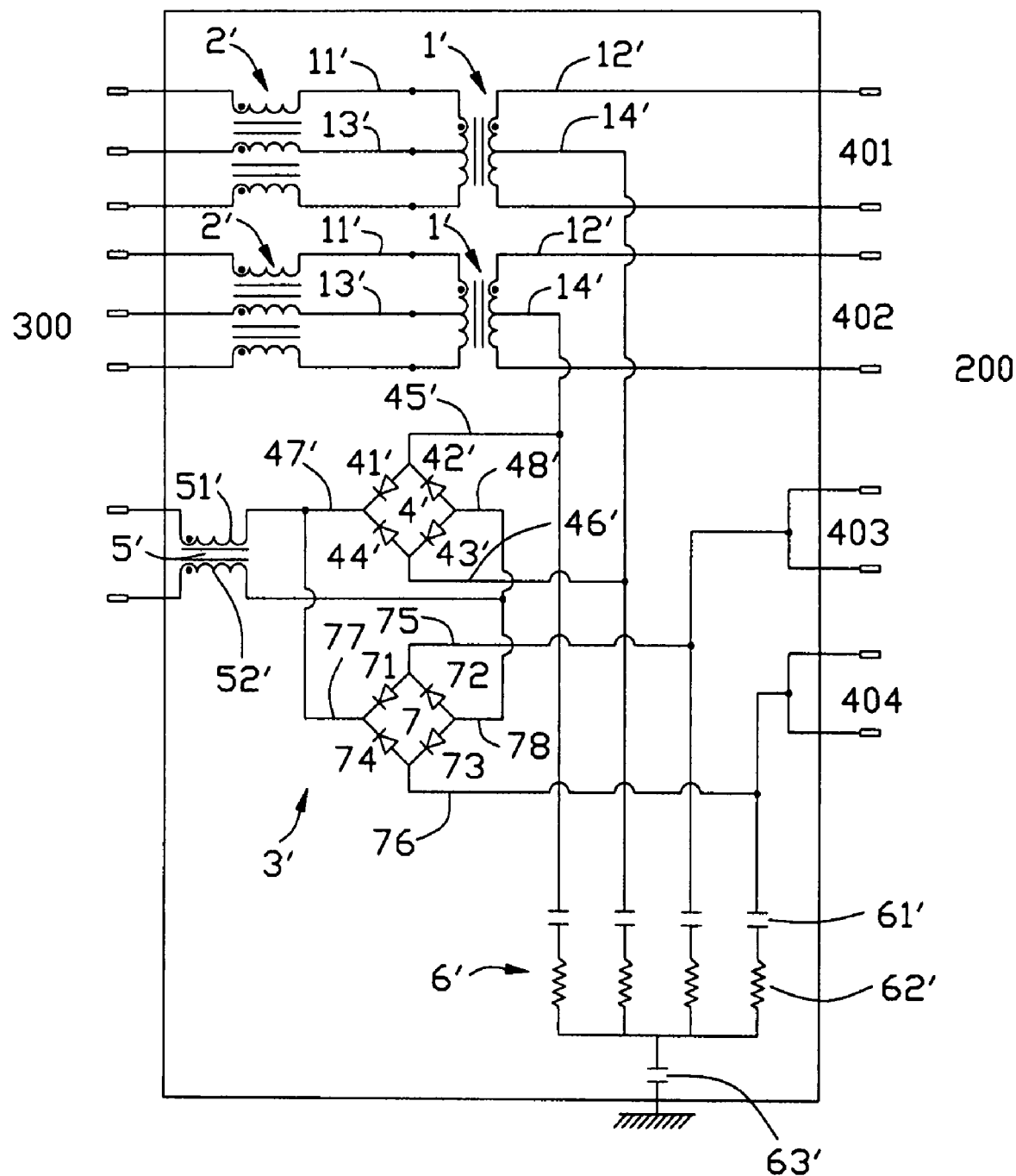
FIG. 2 is a schematic view of the magnetic interface circuit applied in the 10/100 Base-T PoE.
Figure 3:
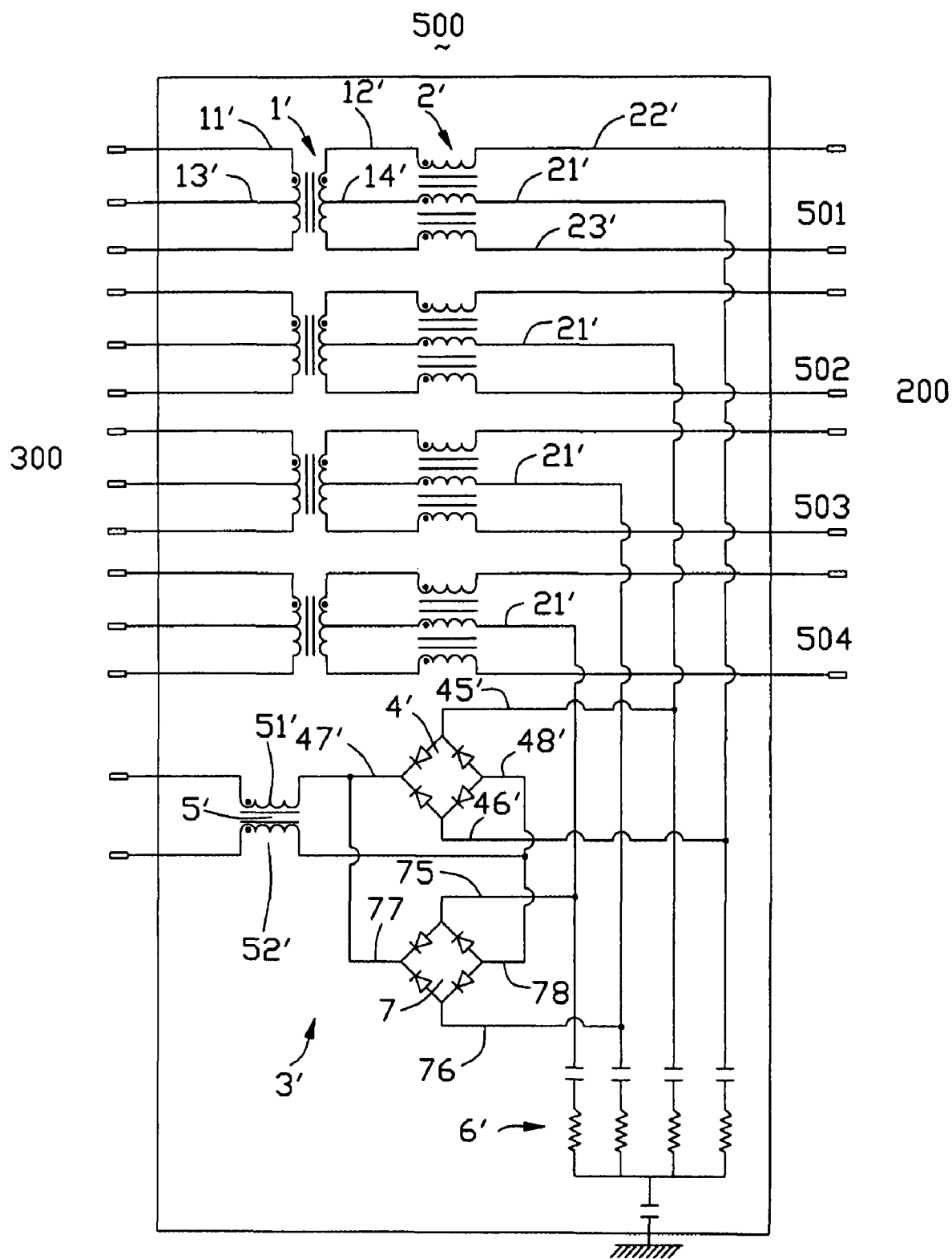
FIG. 3 is a schematic view of the magnetic interface circuit applied in the 10/100/1000 Base-T PoE.

Reference will now be made to the drawing figures to describe the present invention in detail. Referring to FIGS. 1-3, a magnetic interface circuit 100 in accordance with the preferred embodiment of the present invention is electrically connected between a DC power supply 200 and an inner network 300. The magnetic interface circuit 100 comprises a transmit channel 101, a receive channel 102, an absorb network 3, and a termination network 6. The transmit channel 101 and the receive channel 102 have substantially same configurations and each comprise an isolation transformer 1 and a 3-wire CMC 2.

Referring to FIG. 1, the isolation transformer 1 comprises a primary winding 11 and a secondary winding 12. The primary winding 11 is connected to the 3-wire CMC 2 and is provided with a pair of output taps 111 and a center tap 13. The secondary winding 12 has a pair of input taps 121 connected to the DC power supply 200, and a center tap 14 connected to the absorb network 3. The 3-wire CMC 2 is connected between the inner network 300 and the transformer 1 and is composed of three windings for achieving an improved EMI (Electromagnetic Interference) performance better than EMI performance of a 2-wire CMC. The 3-wire CMC 2 comprises a first outer-tap 22, a second outer-tap 23 respectively connected to corresponding output taps 111 of the primary winding 11, and a middle tap 21 disposed between the first and the second outer-taps 22, 23 and connected to the center tap 13 of the primary winding 11.

The absorb network 3 comprises a bridge rectifying circuit 4 and a 2-wire CMC 5. The bridge rectifying circuit 4 is provided with a first, a second, a third and a fourth diodes 41-44 connected end to end. The cathode of the second diode 42 is connected to the anode of the first diode 41. The anode of the third diode 43 is connected to the anode of the second diode 42. The cathode and the anode of the fourth diode 44 are respectively connected to the cathode of the first diode 41 and the cathode of the third diode 43.

A first input tap 45 is provided between the bridge rectifying circuit 4 and the receive channel 102, with one end thereof connected between the first and the second diodes 41, 42, and another end thereof connected to the center tap 14 of the secondary winding 12 of the receive channel 102. A second input tap 46 is provided between the bridge rectifying circuit 4 and the transmit channel 101, with one end thereof connected between the third and the fourth diodes 43, 44, and another end thereof connected to the center tap 14 of the secondary winding 12 of the transmit channel 101. A first output tap 47 is provided between the first and the fourth diodes 41, 44. A second output tap 48 is provided between the second and the third diodes 42, 43.

The 2-wire CMC 5 comprises a first winding 51 connected between the first output tap 47 and the inner network 300, and a second winding 52 connected between the second output tap 48 and the inner network 300.

The termination network 6 is provided with a pair of DC blocking capacitors 61, a pair of resistors 62, and a grounding capacitor 63. Each blocking capacitor 61 is connected to one resistor 62 in series and the serially connected blocking capacitor 61 and resistor 62 are connected in parallel fashion and are then grounded through the grounding capacitor 63. The center taps 14 of the transmit channel 101 and the receive channel 102 respectively connected to the second input tap 46 and the first input tap 45 are further respectively connected to the termination network 6.

When the transmit channel 101 is connected to the voltage source V+ of the DC power supply 200, the receive channel 102 is therefore connected to the voltage source V− of the power supply 200. The first input tap 45 of the bridge rectifying circuit 4 connected with the center tap 14 of the receive channel 102 is thereby connected to the voltage source V−. The second input tap 46 of the bridge rectifying circuit 4 connected with the center tap 14 of the transmit channel 101 is thereby connected to the voltage source V+. An electrical current is drawn from the voltage source V+ to the voltage source V−, through the center tap 14 of the transmit channel 101, the fourth diode 44, the first winding 51 of the 2-wire CMC 5, the inner network 300, the second winding 52 of the 2-wire CMC 5, the second diode 42, and the center tap 14 of the receive channel 102 in sequence. At that time, the first winding 51 has V+ loaded thereon, and the second winding 52 has V− loaded thereon.

When the transmit channel 101 is connected to the voltage source V− of the power supply 200, the receive channel 102 is therefore connected to the voltage source V+ of the power supply 200. An electrical current is drawn from the voltage source V+ to the voltage source V−, through the center tap 14 of the receive channel 102, the first diode 41, the first winding 51 of 2-wire CMC 5, the inner network 300, the second winding 52 of the 2-wire CMC 5, the third diode 43, and the center tap 14 of the transmit channel 101 in sequence. At that time, the first winding 51 has V+ loaded thereon, and the second winding 52 has V− loaded thereon.

No matter the power supply 200 has cathode or anode connected to the transmit channel 101, the interface circuit 100 and the inner network 300 always have an electrical loop formed therein. The first and the second windings 51, 52 of the 2-wire CMC 5 respectively have V+, V− loaded thereon so that the inner network 300 gets available power supply having unchanged polarities.

In the above processes, the 2-wire CMC 5 is adapted for preventing noise transmitting between the bridge rectifying circuit 4 and the inner network 300. The DC blocking capacitors 61 is capable of preventing direct current from being grounded and is adapted for leading noise produced from the interface circuit 100 to ground.

In another embodiment, the 3-wire CMC 2 could be connected between the DC power supply 200 and the isolation transformer 1. In such case, the first and the second input taps 45, 46 of the absorb network 3 are connected to corresponding middle taps 21 of the 3-wire CMC 2.

The $^{10}/_{100}$ Base-T Ethernet has two pairs of twisted-pairs for transmitting data signal and another two pairs of spare twisted-pairs. The 1000 Base-T Ethernet has four pairs of twisted-pairs for transmitting data.

Referring to FIG. 2, a magnetic interface circuit 400 applied in $^{10}/_{100}$ Base-T PoE comprises a transmit channel 401, a receive channel 402, a first spare channel 403, a second spare channel 404, an absorb network 3', and a termination network 6'. The transmit channel 401 and the receive channel 402 respectively have an isolation transformer 1', and a 3-wire CMC 2', substantially same to that of the transmit channel 101 and the receive channel 102 described above with reference to FIG. 1. The first spare channel 403 and the second spare channel 404 respectively have a pair of input taps (not labeled) connected in parallel fashion and then commoned to the termination network 6'.

The termination network 6' is provided with four DC blocking capacitors 61', four resistors 62', and a grounding capacitor 63'. Each blocking capacitor 61' is connected to one resistor 62' in series. Four series connected DC blocking capacitors 61' and resistors 62' are connected in parallel fashion and are then grounded through the grounding capacitor 63'.

The absorb network 3' is composed of a first bridge rectifying circuit 4', a second bridge rectifying circuit 7, and a 2-wire CMC 5' having a first winding 51' and a second winding 52'. The first and the second bridge rectifying circuits 4', 7 having substantially same configurations are respectively provided with a first, a second, a third and a fourth diodes 41'-44', 71-74 connected end to end. The connection of the diodes 41'-44', 71-74 are substantially same to the connection of the diodes 41-44.

A first input tap 45' is provided between the first bridge rectifying circuit 4' and a center tap 14' of the isolation transformer 1' of the receive channel 402. A second input tap 46' is provided between the bridge rectifying circuit 4' and a center tap 14' of the isolation transformer 1' of the transmit channel 401. A first output tap 47' is provided between the first bridge rectifying circuit 4' and the first winding 51' of the 2-wire CMC 5'. A second output tap 48' is provided between the first bridge rectifying circuit 4' and the second winding 52' of the 2-wire CMC 5'.

A third input tap 75 is provided between the second bridge rectifying circuit 7 and the first spare channel 403. A fourth input tap 76 is provided between the second bridge rectifying circuit 7 and the second spare channel 404. A third output tap 77 is connected from the second bridge rectifying circuit 7 to the first output tap 47' which is connected to the first winding 51'. A fourth output tap 78 is connected from the second bridge rectifying circuit 7 to the second output tap 48' and to the second winding 52'.

Referring to FIG. 3, a magnetic interface circuit 500 applied in 10/100/100 Base-T PoE comprises a first through fourth channels 501-504, the absorb network 3', and the termination network 6'. The first through fourth channels 501-504 have same configurations. Each channel 501-504 has the 3-wire CMC 2', the isolation transformer 1' connected between the 3-wire CMC 2' and the inner network 300. The isolation transformer 1' has a primary winding 11' connected to the inner network 300, and a secondary winding 12' connected to the 3-wire CMC 2'.

The absorb network 3' comprises a first and a second bridge rectifying circuits 4', 7, and the 2-wire CMC 5'. The first and the second input taps 45', 46' of the first bridge rectifying circuit 4' are respectively connected to the middle taps 21' of the second and the first channel 502, 501. The third and the fourth input taps 75, 76 of the second bridge rectifying circuit 7 are respectively connected to the middle taps 21' of the fourth, the third channels 504, 503. The first and the third output taps 47', 77 of the first and the second bridge rectifying circuits 4', 7 are connected to the first winding 51' of the 2-wire CMC 5'. The second and the fourth output taps 48', 78 of the first and the second bridge rectifying circuits 4', 7 are connected to the second winding 52' of the 2-wire CMC 5'.

However, the disclosure is illustrative only, changes may be made in detail, especially in matter of shape, size, and arrangement of parts within the principles of the invention.

What is claimed is:

1. A magnetic interface circuit, comprising:
   a transmit channel and a receive channel each comprising a 3-wire common mode choke having a pair of outer taps and a middle tap, and an isolation transformer connected with the 3-wire common mode choke, the isolation transformer having a primary winding and a secondary winding, and wherein said primary winding having a pair of first output taps connected with said outer taps and a first center tap connected with said middle tap, said secondary winding having a pair of second input taps and a second center tap;
   a first spare channel and a second spare channel; and
   an absorb network comprising a bridge rectifying circuit adapted for converting an electrical current, the bridge rectifying circuit having a pair of input taps each connected with corresponding second center tap of the isolation transformers, and a pair of output taps, said absorb network further comprising another bridge rectifying circuit having a pair of input taps respectively connected with the first and the second spare channels, and a pair of output taps connected with said pair of output taps of said bridge rectifying circuit in shunt-wound circuit.

2. The magnetic interface circuit claimed in claim 1, wherein said bridge rectifying circuit comprises a first, a second, a third and a fourth diodes connected end to end, and wherein polarity of the first diode conforms with polarity of the second diode, polarity of the third diode conforms with polarity of the fourth diode, and polarity of the third and the fourth diodes opposes polarity of the first and the second diodes.

3. The magnetic interface circuit as claimed in claim 2, wherein one of said input taps of the bridge rectifying circuit is connected between the first and the second diodes, and the other input tap of the bridge rectifying circuit is connected between the third and the fourth diodes.

4. The magnetic interface circuit claimed in claim 3, wherein said absorb network comprises a 2-wire common mode choke connected to the bridge rectifying circuit, the 2-wire common mode choke having a first winding and a second winding, and wherein said output taps of the bridge rectifying circuit comprises a third output tap having one end connected between the first and the fourth diodes and having the other end connected to the first winding of the 2-wire common mode choke, and a fourth output tap having one end connected between the second and the third diodes and having the other end connected to the second winding of the 2-wire common mode choke.

5. The magnetic interface circuit claimed in claim 1, further comprising a termination network provided with a grounding capacitor, a pair of resistors, and a pair of blocking capacitors, each one of the pair of blocking capacitors being connected with the second center tap of a corresponding isolation transformer, and wherein each blocking capacitor is connected to one resistor in series and the two serially connected blocking capacitor and resistor are connected in parallel fashion and are then grounded through the grounding capacitor.

6. A magnetic interface circuit, comprising:
   a plurality of channels each comprising a 3-wire common mode choke having a pair of outer taps and a middle tap, and an isolation transformer connected with the 3-wire common mode choke, the isolation transformer having a primary winding and a secondary winding and having a pair of connection taps connected with said outer taps and a center tap connected with said middle tap; and
   an absorb network comprising a pair of bridge rectifying circuits adapted for converting an electrical current, each bridge rectifying circuit having a pair of input taps each connected with corresponding middle taps of the 3-wire common mode chokes, each bridge rectifying circuit having a first and a second output taps; and
   a 2-wire common mode choke having a first winding and a second winding, said two first output taps of the pair of bridge rectifying circuits being connected into a shunt-wound circuit to connect with the first winding, said two second output taps of the pair of bridge rectifying circuits being connected into a shunt-wound circuit to connect with the second winding of said 2-wire common mode choke.

7. The magnetic interface circuit claimed in claim 6, wherein each bridge rectifying circuit comprises a first, a second, a third and a fourth diodes connected end to end, and wherein polarity of the first diode conforms with polarity of the second diode and polarity of the third and the fourth diodes opposes polarity of the first and the second diodes.

8. The magnetic interface circuit claimed in claim 7, wherein one of said input taps of the bridge rectifying circuit is connected between the first and the second diodes, and the other input tap of the bridge rectifying circuit is connected between the third and the fourth diodes.

9. The magnetic interface circuit claimed in claim 8, wherein said first output tap has one end connected between the first and the fourth diodes and has the other end connected to the first winding of the 2-wire common mode choke, and said second output tap has one end being connected between the second and the third diodes and has the other end being connected to the second winding of the 2-wire common mode choke.

10. The magnetic interface circuit claimed in claim 6, further comprising a termination network provided with a grounding capacitor, a pair of resistors, and a pair of blocking capacitors, each one of the pair of blocking capacitors being connected with the second center tap of a corresponding isolation transformer, and wherein each blocking capacitor is connected to one resistor in series and the two serially connected blocking capacitor and resistor are connected in parallel fashion and are then grounded through the grounding capacitor.

* * * * *